US008456875B2

(12) United States Patent
Li et al.

(10) Patent No.: US 8,456,875 B2
(45) Date of Patent: Jun. 4, 2013

(54) POWER SUPPLY DEVICE AND UNIFORM CURRENT CONTROL METHOD

(75) Inventors: Jingyan Li, Taipei (TW); Qinglin Zhao, Taipei (TW); Zhihong Ye, Taipei (TW); Mingzhu Li, Taipei (TW); Fei Luo, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 697 days.

(21) Appl. No.: 12/654,949

(22) Filed: Jan. 11, 2010

(65) Prior Publication Data

US 2011/0080146 A1    Apr. 7, 2011

(30) Foreign Application Priority Data

Oct. 1, 2009  (CN) .......................... 2009 1 0192983

(51) Int. Cl.
    *H02M 7/00* (2006.01)
(52) U.S. Cl.
    USPC ........................................................ 363/65
(58) Field of Classification Search
    USPC .................................................... 363/65–72
    See application file for complete search history.

(56) References Cited

U.S. PATENT DOCUMENTS

| 6,346,798 | B1 * | 2/2002 | Passoni et al. ................ 323/272 |
| 6,891,736 | B2 * | 5/2005 | Takemura et al. .............. 363/65 |
| 7,375,993 | B2 * | 5/2008 | Beland ............................ 363/71 |
| 7,835,165 | B2 * | 11/2010 | Hatanaka ....................... 363/69 |
| 8,022,678 | B2 * | 9/2011 | Li et al. ......................... 323/207 |

\* cited by examiner

*Primary Examiner* — Jessica Han
(74) *Attorney, Agent, or Firm* — Rosenberg, Klein & Lee

(57) ABSTRACT

A power supply device for providing an output voltage includes a first resonant converter, a second resonant converter, a first converting circuit, and a current regulating circuit. The first resonant converter is for converting a first input voltage into the output voltage. The second resonant converter is for converting a second input voltage into the output voltage. The output ends of the first and second resonant converters are coupled in parallel. The first converting circuit is coupled to the first resonant converter and is operable to provide the first input voltage to the first resonant converter. The current regulating circuit receives signals related to output currents of the first and second resonant converters, and drives operation of the first converting circuit according to the signals received thereby such that the output currents of the first and second resonant converters have substantially equal magnitudes.

18 Claims, 10 Drawing Sheets

POWER SUPPLY DEVICE AND UNIFORM CURRENT CONTROL METHOD

CROSS-REFERENCE TO RELATED APPLICATION

This application claims priority of Chinese Application No. 200910192983.2, filed on Oct. 1, 2009.

BACKGROUND OF THE INVENTION

1. Field of the Invention

The present invention relates to a power supply device, more particularly to a power supply device having two resonant converters that are coupled in parallel.

2. Description of the Related Art

Resonant converters are known to have advantages such as high conversion efficiency and low cost, and are hence commonly used in high power isolated DC/DC conversion. Nevertheless, because resonant converters operate on sinusoidal current waveforms, currents generated by resonant converters have high ripple factor even after current rectification. A conventional technique for reducing ripple factor involves phase-shifting output currents of the parallel-connected resonant converters.

However, various factors could affect output currents of the parallel-connected resonant converters, making the output currents non-uniform, and subsequently affecting the conversion efficiency of the resonant converters. Moreover, non-uniformity of the output currents affects the reduction of ripple current.

Therefore, resonant converters operating in a current sharing mode need uniform current control. Referring to FIG. 1, a conventional power supply device 900 includes a first resonant converter 91 and a second resonant converter 92 that are coupled in parallel to provide an output voltage $V_O$. The conventional power supply device 900 has two feedback paths.

The first feedback path involves a voltage controller 93. The voltage controller 93 generates a control signal according to the output voltage $V_O$ received from output sides of the first resonant converter 91 and the second resonant converter 92, and provides the control signal to a buck converter 94 so as to control switching frequency of a power switch (not shown) therein, thereby enabling conversion of a 400V signal from a power factor correcting circuit 95 into a 300V input voltage that is provided to the first and second resonant converters 91, 92 by the buck converter 94.

The second feedback path involves a subtractor 96 and a load-balancing controller 97. The subtractor 96 generates a difference signal corresponding to a difference between output currents $I_{OA}$, $I_{OB}$ received from the output sides of the first and second resonant converters 91, 92. The load-balancing controller 97 generates a driving signal, according to the difference signal generated by the subtractor 96, for controlling switching frequency of a power switch (not shown) of each of the first and second resonant converters 91, 92, thereby controlling the output currents $I_{OA}$, $I_{OB}$.

Nonetheless, since the internal circuits of the first and second resonant converters 91, 92 of the conventional power supply device 900 are not identical, control of the switching frequencies of the power switches of the first and second resonant converters 91, 92 to achieve uniform output currents is difficult to implement.

SUMMARY OF THE INVENTION

Therefore, an object of the present invention is to provide a power supply device capable of achieving uniform output currents.

Accordingly, a power supply device of the present invention is for providing an output voltage, and includes a first resonant converter, a second resonant converter, a first converting circuit, and a current regulating circuit.

The first resonant converter is for receiving a first input voltage and converting the first input voltage into the output voltage. The second resonant converter is for receiving a second input voltage and converting the second input voltage into the output voltage. The first and second resonant converters have output ends that are for outputting the output voltage and that are coupled in parallel. The first converting circuit is coupled to the first resonant converter and is operable to provide the first input voltage to the first resonant converter. The current regulating circuit is coupled to the first and second resonant converters, for receiving signals that are related to output currents of the first and second resonant converters. The current regulating circuit drives operation of the first converting circuit according to the signals received thereby such that the output currents of the first and second resonant converters have substantially equal magnitudes.

Another object of the present invention is to provide a uniform current control method for enabling a power supply device to achieve uniform current output on a power supply device.

Accordingly, the uniform current control method of the present invention is to be performed by a power supply device that includes a first resonant converter and a second resonant converter having output ends thereof coupled in parallel. The method includes two steps.

The first step involves sampling output currents of the first and second resonant converters. The second step involves controlling input voltage to at least one of the first and second resonant converters according to the sampled output currents such that the output currents of the first and second resonant converters are controlled to have substantially equal magnitudes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
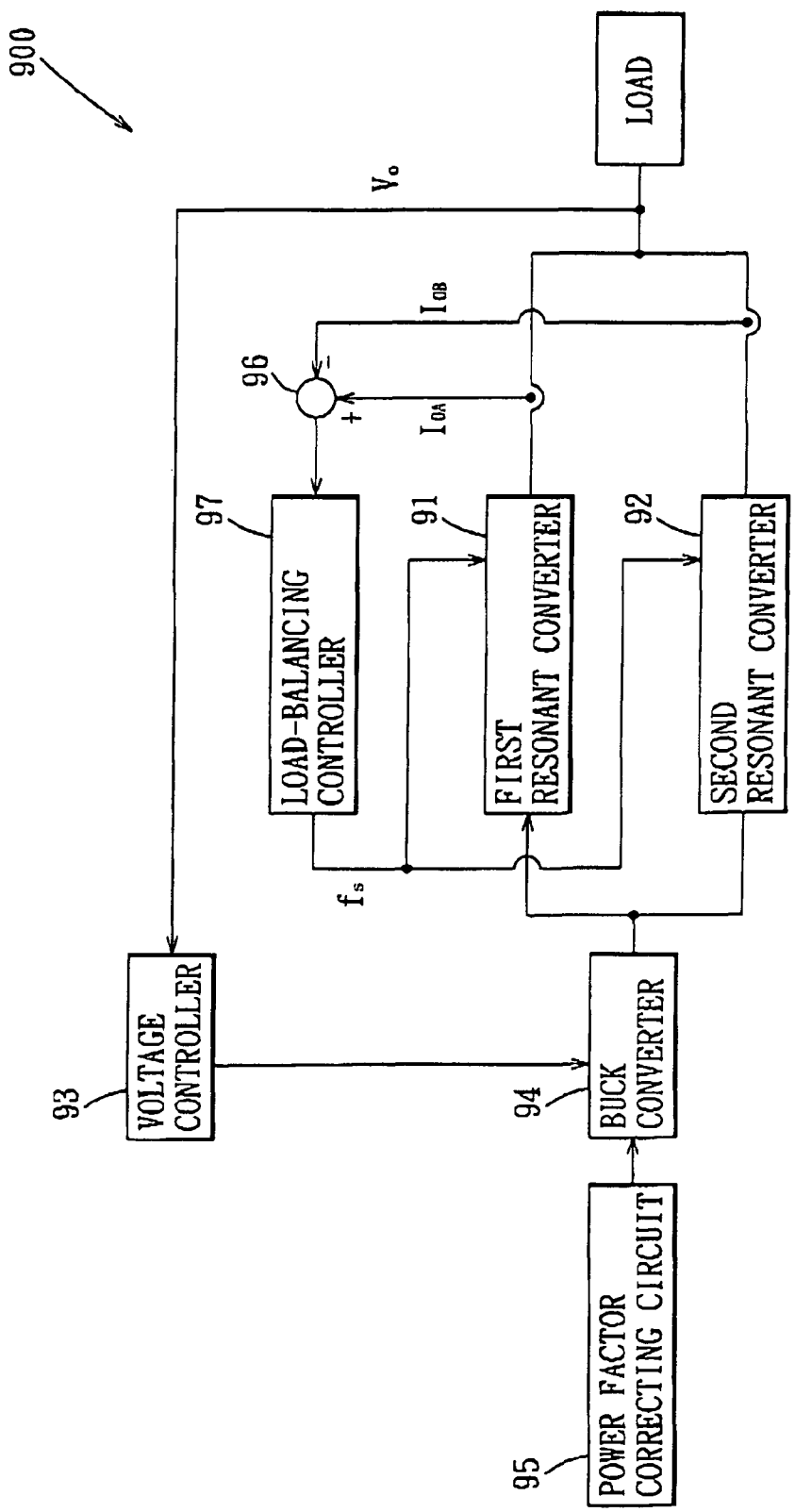
FIG. 1 is a schematic circuit block diagram of a conventional power supply device operating in a current sharing mode with two feedback paths for regulating output currents thereof.

Before the present invention is described in greater detail, it should be noted that like elements are denoted by the same reference numerals throughout the disclosure.

Figure 2:
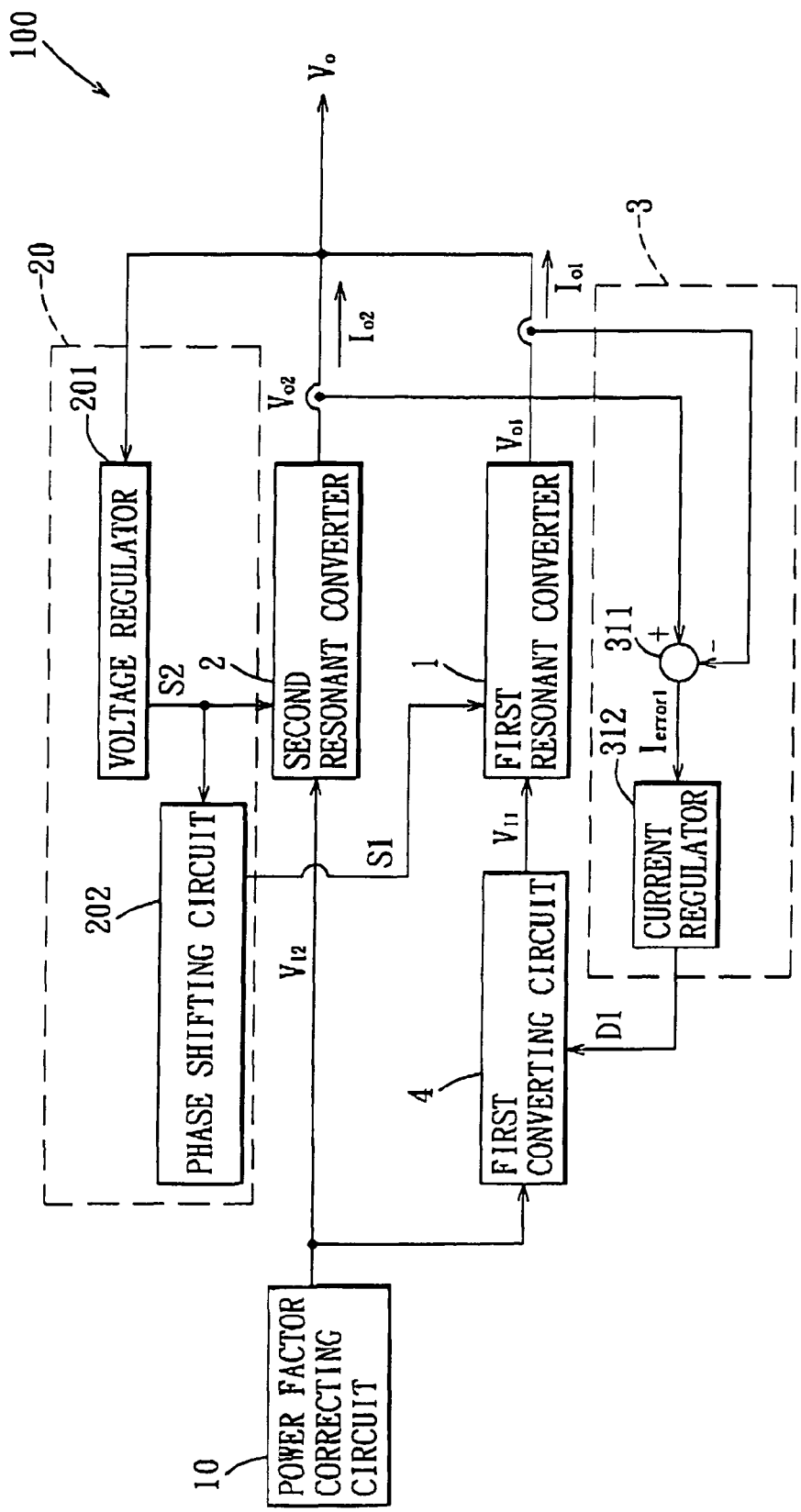
FIG. 2 is a schematic circuit block diagram of the first preferred embodiment of a power supply device according to the present invention.

Referring to FIG. 2, the first preferred embodiment of a power supply device 100 according to the present invention includes a Power Factor Correcting (PFC) circuit 10, a first resonant converter 1, a second resonant converter 2, a current regulating circuit 3, and a first converting circuit 4.

The PFC circuit 10 converts and rectifies an AC power signal (not shown) into a second input voltage $V_{I2}$, and provides the second input voltage $V_{I2}$ to the second resonant converter 2 and the first converting circuit 4. The first converting circuit 4 converts the second input voltage $V_{I2}$ into a first input voltage $V_{I1}$, and is coupled to the first resonant converter 1, for providing the first input voltage $V_{I1}$ thereto.

The first and second resonant converters 1, 2 respectively receive the first and second input voltages $V_{I1}$, $V_{I2}$, respectively convert the first and second input voltages $V_{I1}$, $V_{I2}$ into an output voltage $V_O$, and have output ends thereof coupled in parallel for providing the output voltage $V_O$. The first and second resonant converters 1, 2 generate first and second output currents $I_{O1}$, $I_{O2}$ respectively. Each of the first and second resonant converters 1, 2 can be a LC parallel/series resonant converter, a LLC parallel/series resonant converter, or the like.

The current regulating circuit 3 of the power supply device 100 enables the power supply device 100 to achieve uniform current output, and includes a subtractor 311 and a current regulator 312. The subtractor 311, is coupled to the output ends of the first and second resonant converters 1, 2, and is for generating a first error signal $I_{error1}$ corresponding to a difference between the output currents $I_{O1}$, $I_{O2}$ received from the first and second resonant converters 1, 2, respectively. The current regulator 312 is coupled between the subtractor 311 and the first converting circuit 9. The current regulator 312 generates a first driving signal D1 according to the first error signal $I_{error1}$ received from the subtractor 311, and provides the first driving signal D1, which is a digital pulse signal, to the first converting circuit 4. The first input voltage $V_{I1}$ generated by the first converting circuit 4 is adjusted through driving a power switch (not shown) of the first converting circuit 4 according to the first driving signal D1 so that the output current $I_{O1}$ from the first resonant converter 1 has a magnitude substantially equal to that of the second output current $I_{O2}$.

Specifically, if the first output current $I_{O1}$ is greater than the second output current $I_{O2}$, the current regulator 312 decreases a duty cycle of the first driving signal D1 so as to lower the first input voltage $V_{I1}$, thereby reducing the magnitude of the first output current $I_{O1}$. On the other hand, if the first output current $I_{O1}$ is less than the second output current $I_{O2}$, the current regulator 312 increases the duty cycle of the first driving signal D1 so as to increase the first input voltage $V_{I1}$, thereby increasing the magnitude of the first output current $I_{O1}$.

It is to be noted that, according to need, the first and second resonant converters 1, 2 may be modified to have output ends thereof uncoupled for providing a respective one of a first output voltage $V_{O1}$ and a second output voltage $V_{O2}$ such that the first error signal $I_{error1}$ may alternatively be acquired from a difference between the first and second output voltages $V_{O1}$, $V_{O2}$.

Figure 3:
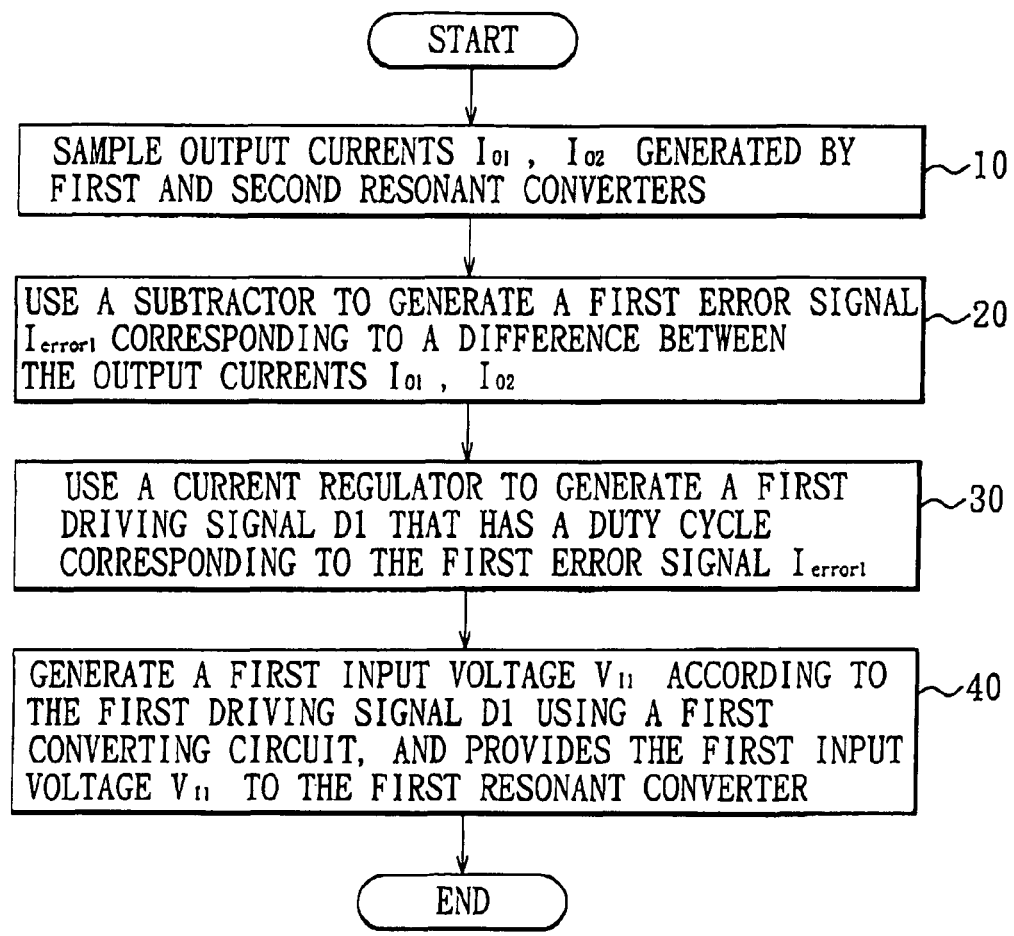
FIG. 3 is a flow chart illustrating the first preferred embodiment of a control method for making output currents of a first resonant converter and a second resonant converter substantially equal in magnitude.

Referring to FIG. 3, the current regulating circuit 3 of the power supply device 100 performs a control method including four steps:

in Step 10, sampling output currents $I_{O1}$, $I_{O2}$ generated by the first and second resonant converters 1, 2;

in Step 20, generating a first error signal $I_{error1}$ corresponding to a difference between the output currents $I_{O1}$, $I_{O2}$;

in Step 30, generating a first driving signal D1 that has a duty cycle corresponding to the first error signal $I_{error1}$ using the current regulator 312; and in Step 40, based on the first driving signal D1, adjusting the first input voltage $V_{I1}$ to make the first and second output currents $I_{O1}$, $I_{O2}$ substantially equal in magnitude.

It is to be noted that depending on gain of each of the first and second resonant converters 1, 2, the first converting circuit 4 can be one of a boost converter, a buck converter, or a buck-boost converter. If gain of the first resonant converter 1 is greater than that of the second resonant converter 2, the first converting circuit 4 needs to decrease the first input voltage $V_{I1}$ provided to the first resonant converter 1 so that output powers of the first and second resonant converters 1, 2 are the same and the first and second output currents $I_{O1}$, $I_{O2}$ are substantially equal in magnitude. Hence, the first converting circuit 4 needs to be a buck converter or a buck-boost converter. If otherwise, the first converting circuit 4 needs to increase the first input voltage $V_{I1}$, and thus the first converting circuit 4 needs to be a boost converter or a buck-boost converter.

To further stabilize the output voltage $V_O$ and reduce ripple factor, the power supply device 100 further includes a control signal generating circuit 20 that includes a voltage regulator 201 and a phase shifting circuit 202. The voltage regulator 201 is coupled to the output ends of the first and second resonant converters 1, 2, for generating a second control signal S2 according to the output voltage $V_O$. The voltage regulator 201 is further coupled to the second resonant converter 2, for providing the second control signal S2 thereto. The phase shifting circuit 202 is coupled to the voltage regulator 201, for receiving the second control signal S2, and phase shifts the second control signal S2 by a predetermined angle to generate a first control signal S1. The phase shifting circuit 202 is further coupled to the first resonant converter 1, for providing the first control signal S1 thereto. The first and second control signals S1, S2 are digital pulse signals with duty cycles regulated by the voltage regulator 201, for regulating the output voltage $V_O$ of the first and second resonant converters 1, 2.

Specifically, if the output voltage $V_O$ is too high, the voltage regulator 201 will increase the switching frequency of the control signals S2, S1 to lower the output voltage $V_O$. The voltage regulator 201 will reduce the switching frequency if otherwise.

Figure 4:
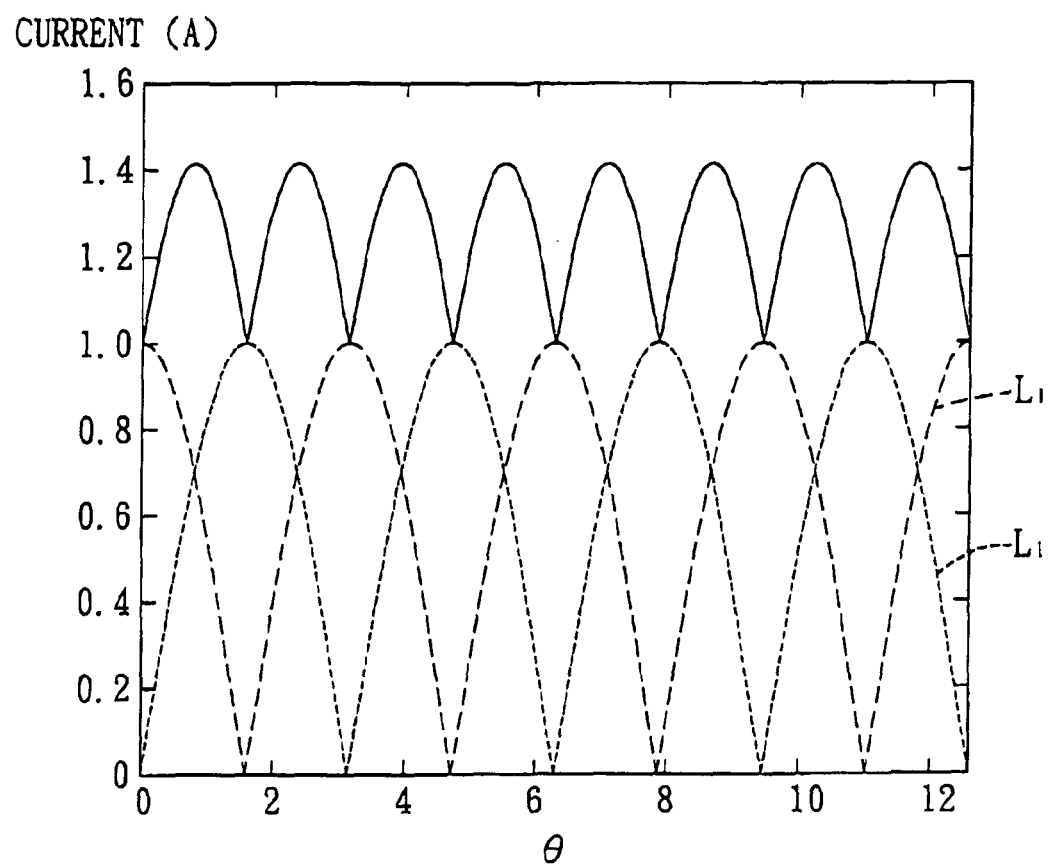
FIG. 4 is a diagram showing the output currents with 90-degree phase shift, and a corresponding ripple current.

It is to be noted that, in the present embodiment, the first and second control signals S1, S2 have substantially equal magnitudes, but have a 90-degree phase difference due to processing by the phase shifting circuit 202. The 90-degree phase difference can minimize ripple factor of the first and second output currents $I_{O1}$, $I_{O2}$. Referring to FIG. 4, where L1 and L2 represent the output currents $I_{O1}$, $I_{O2}$, respectively, it can be noted that when the phases of the first and second output currents $I_{O1}$, $I_{O2}$ differ by 90 degrees, the ripple current is minimized to 0.4 A (1 A–1.4 A). However, the phase difference between the first and second control signals S1 and S2 is not limited to 90 degrees.

Furthermore, each of the first and second resonant converters 1, 2 is capable of operating independently of the other. Hence, if one of the first and second resonant converters 1, 2 breaks down, the other one of the first and second resonant converters 1, 2 can still operate to maintain normal operation of the power supply device 100. Moreover, if the power supply device 100 is connected to a light load (not shown), one of the first and second resonant converters 1, 2 can be shut down to improve the efficiency of the power supply device 100. Therefore, users and designers can adjust configuration and operational settings of the power supply device 100 according to need.

Figure 5:
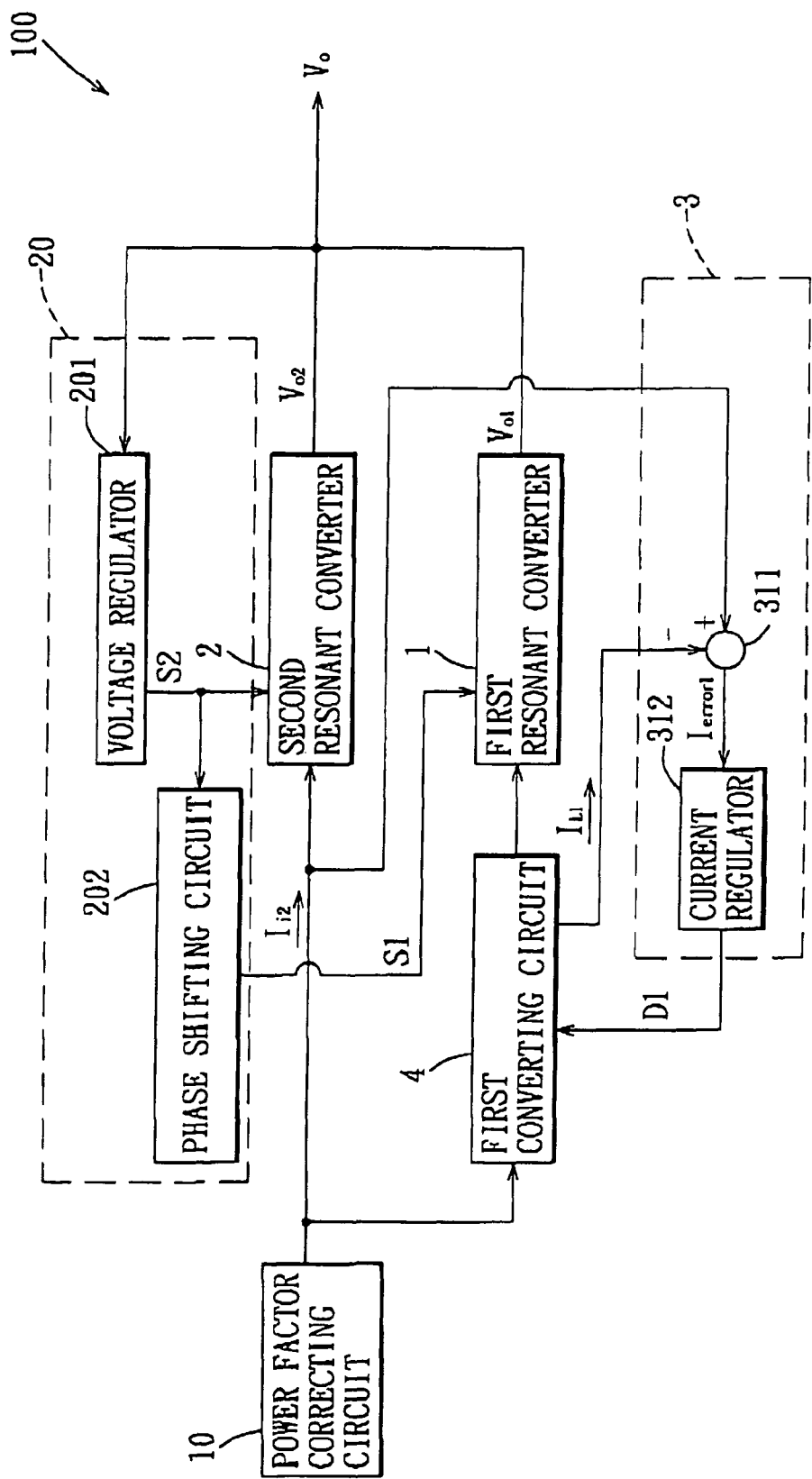
FIG. 5 is a schematic circuit block diagram of the second preferred embodiment of a power supply device according to the present invention.
Figure 6:
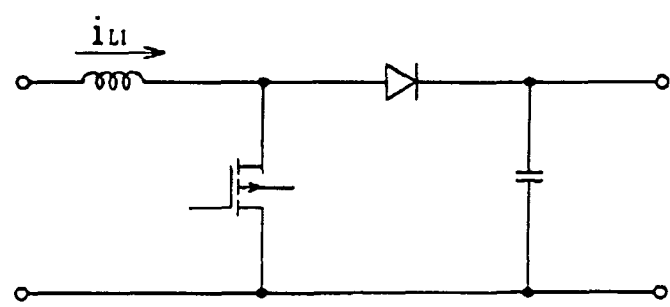
FIG. 6 is a circuit diagram illustrating a portion of an internal circuit structure of the first converting circuit of the second preferred embodiment.

Referring to FIG. 5, the second preferred embodiment of a power supply device 100 of the present invention is similar to the first preferred embodiment. The subtractor 311 of the current regulating circuit 3, however, is coupled to the second resonant converter 2 and the first converting circuit 4, for generating the first error signal $I_{error1}$ according to a difference between an input current $I_{I2}$ of the second resonant converter 2 and an inductor current $I_{L1}$ that flows through a storage inductor of the first converting circuit 4 (shown in FIG. 6). Like the previous embodiment, the current regulator 312 is coupled to the subtractor 311 for receiving the first error signal $I_{error1}$ therefrom, generates the first driving signal D1, and is coupled to the first converting circuit 4, for providing the first driving signal D1 to drive operation of a power switch (not shown) of the first converting circuit 4. The operations of, functions of, and connections among the other circuit blocks are the same as those of the first preferred embodiment.

Figure 7:
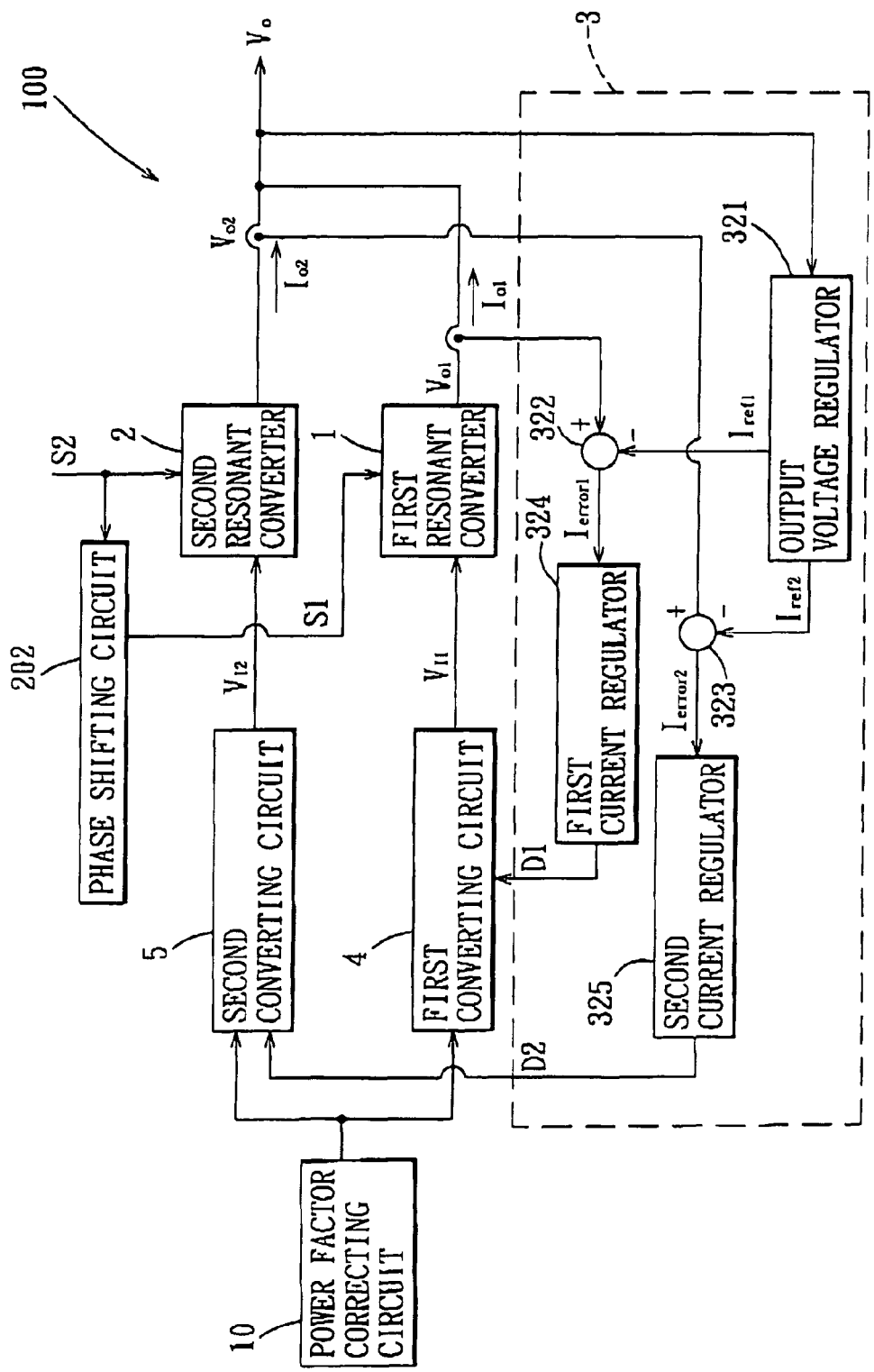
FIG. 7 is a schematic circuit block diagram of the third preferred embodiment of a power supply device according to the present invention.

Referring to FIG. 7, the third preferred embodiment of a power supply device 100 according to the present invention is similar to the first preferred embodiment. However, the power supply device 100 of the third preferred embodiment further includes a second converting circuit 5 and employs a different configuration of the current regulating circuit 3. In the third preferred embodiment, the current regulating circuit 3 includes an output voltage regulator 321, a first subtractor 322, a second subtractor 323, a first current regulator 324, and a second current regulator 325.

The output voltage regulator 321 is coupled to the first and second resonant converters 1, 2, for generating first and second reference currents $I_{ref1}$, $I_{ref2}$ that correspond to the output voltage $V_O$. The first and second reference currents $I_{ref1}$, $I_{ref2}$ are substantially identical in magnitude.

The first subtractor 322 is coupled to the output voltage regulator 321 and the first resonant converter 1, for generating a first error signal $I_{error1}$ according to a difference between the first output current $I_{O1}$ and the first reference current $I_{ref1}$. The first current regulator 324 is coupled to the first subtractor 322 and the first converting circuit 4. The first current regulator 324 receives the first error signal $I_{error1}$, generates a first driving signal D1 according to the first error signal $I_{error1}$, and provides the first driving signal D1 to the first converting circuit 4, for driving operation thereof.

The second subtractor 323 is coupled to the output voltage regulator 321 and the second resonant converter 2, for generating a second error signal $I_{error2}$ corresponding to a difference between the second output current $I_{O2}$ and the second reference current $I_{ref2}$. The second current regulator 325 is coupled between the second subtractor 323 and the second converting circuit 5. The second current regulator 325 receives the second error signal $I_{error2}$, generates a second driving signal D2 according to the second error signal $I_{error2}$, and provides the second driving signal D2 to the second converting circuit 5, for driving operation thereof.

The PFC circuit 10 in this embodiment generates a PFC output voltage (not shown) instead of the second input voltage $V_{I2}$. Each of the first and second converting circuits 4, 5 is coupled to the PFC circuit 10, is one of a boost convert, a buck converter, and a buck-boost converter, and is coupled to a respective one of the first and second resonant converters 1, 2, for providing a corresponding one of the first and second input voltages $V_{I2}$, $V_{I2}$ thereto.

The second driving signal D2 controls switching of a power switch (not shown) of the second converting circuit 5 in a manner that the second input voltage $V_{I2}$ generated by the second converting circuit 5 corresponds to a second output current $I_{O2}$ having a magnitude substantially equal to that of the first output current $I_{O1}$.

Similar to the first converting circuit 4, if gain of the second resonant converter 2 is greater than that of the first resonant converter 1, the second converting circuit 5 needs to be a buck converter or a buck-boost converter to attenuate the PFC output voltage. The second converting circuit 5 needs to be a boost converter or a buck-boost converter if otherwise.

Moreover, in this embodiment, the second control signal S2 is provided to the phase shifting circuit 202 and the second resonant converter 2 by an external control chip (not shown).

Figure 8:
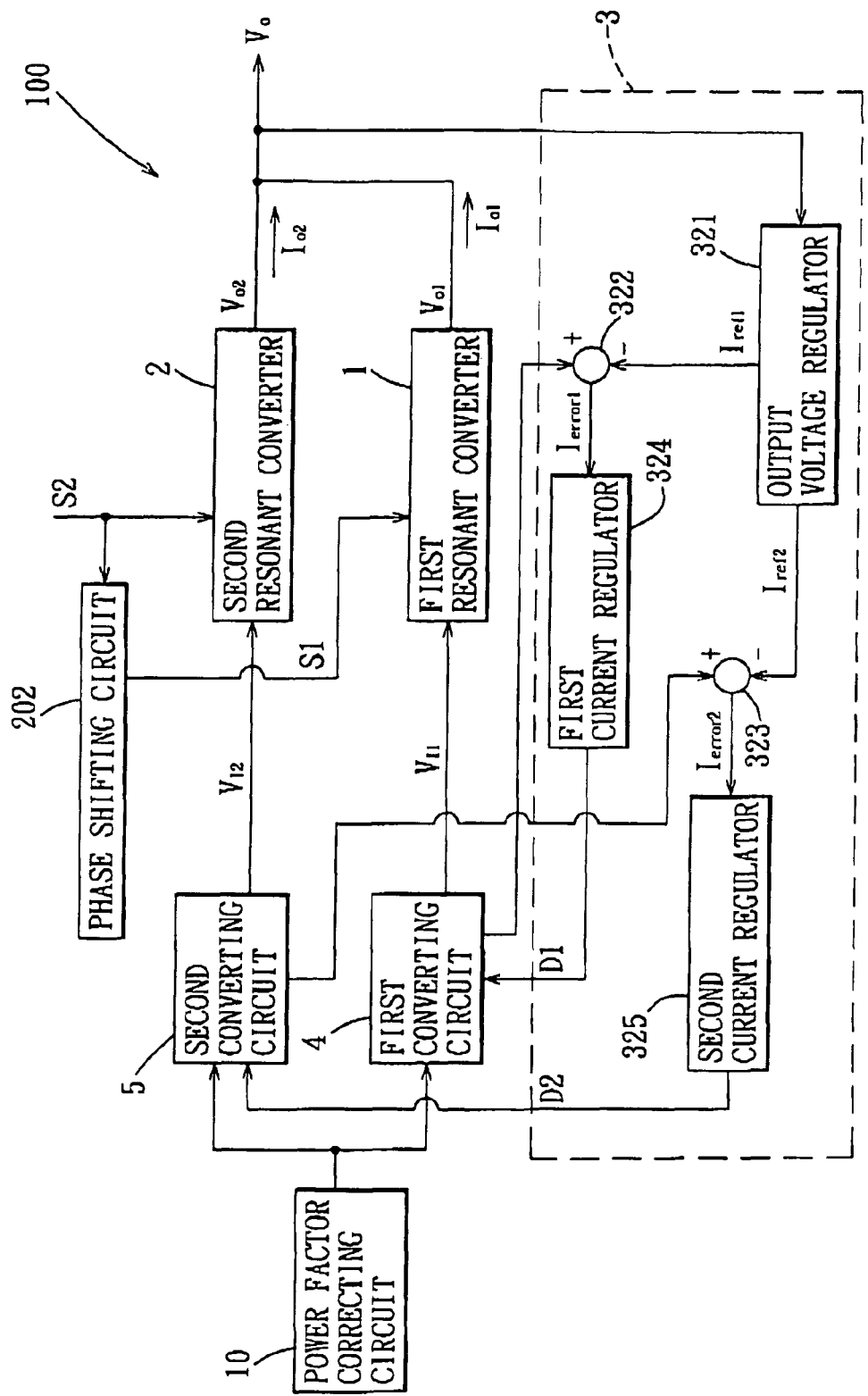
FIG. 8 is a schematic circuit block diagram of the fourth preferred embodiment of a power supply device according to the present invention.

Referring to FIG. 8, the fourth preferred embodiment of a power supply device 100 of the present invention is similar to the third preferred embodiment.

In the fourth preferred embodiment, however, the first subtractor 322 is coupled to the first converting circuit 4 and the output voltage regulator 321 for generating the first error signal $I_{error1}$. The first error signal $I_{error1}$ corresponds to a difference between a first inductor current $I_{L1}$ flowing through a storage inductor of the first converting circuit 4, and the first reference current $I_{ref1}$ of the output voltage regulator 321. The first subtractor 322 provides the first error signal $I_{error1}$ to the first current regulator 324.

Moreover, in the fourth preferred embodiment, the second subtractor 323 is coupled to the second converting circuit 5 and the output voltage regulator 321, for generating the second error signal $I_{error2}$. The second error signal $I_{error2}$ corresponds to a difference between a second inductor current $I_{L2}$ flowing through a storage inductor of the second converting circuit 5, and the second reference current $I_{ref2}$ of the output voltage regulator 321. The second subtractor 323 provides the second error signal $I_{error2}$ to the second current regulator 325. The operations of, functions of, and connections among the other components in the fourth preferred embodiment are the same as those in the third preferred embodiment.

Figure 9:
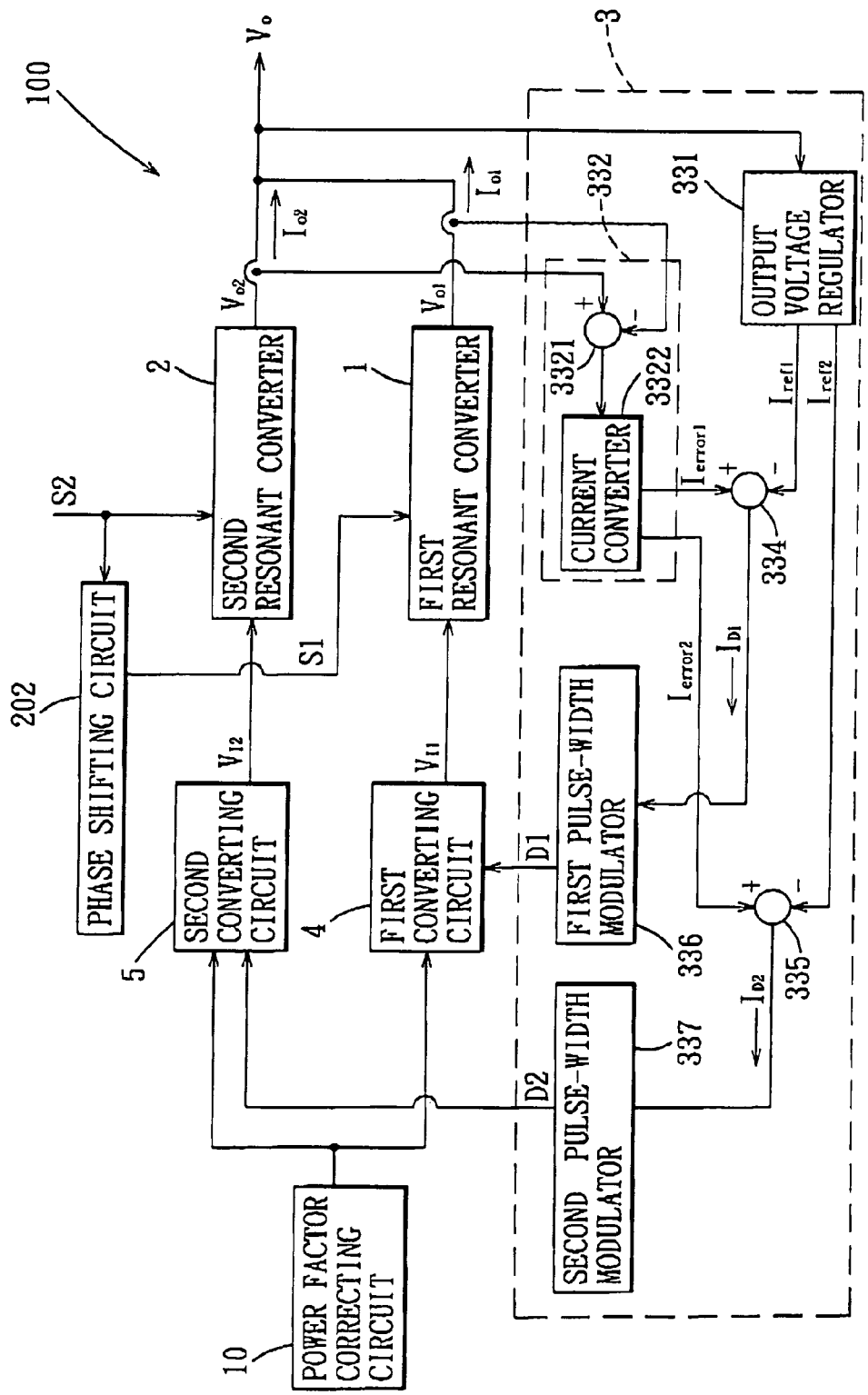
FIG. 9 is a schematic circuit block diagram of the fifth preferred embodiment of a power supply device according to the present invention.

Referring to FIG. 9, the fifth preferred embodiment of a power supply device 100 according to the present invention is similar to the third preferred embodiment. The power supply device 100 of the fifth preferred embodiment, however, has a different current regulating circuit 3. The current regulating circuit 3 of the fifth preferred embodiment includes an output voltage regulator 331, an error current generator 332, an adder 334, a subtractor 335, a first pulse-width modulator 336, and a second pulse-width modulator 337.

The output voltage regulator 331 is coupled to the first and second resonant converters 1, 2, for generating first and second reference currents $I_{ref1}$, $I_{ref2}$ that correspond to the output voltage $V_O$. The first and second reference currents $I_{ref1}$, $I_{ref2}$ are substantially identical in magnitude.

The error current generator 332 includes an error subtractor 3321 and a current converter 3322. The error subtractor 3321 is coupled to the output ends of the first and second resonant converters 1, 2, for generating an error reference signal (not shown), and is coupled to the current converter 3322, for providing the error reference signal thereto. The current converter 3322 generates a first error current $I_{error1}$ and a second error current $I_{error2}$ according to the error reference signal.

The first and second error currents $I_{error1}$, $I_{error2}$ correspond to the difference between the output currents $I_{O1}$, $I_{O2}$ received from the first and second resonant converters 1, 2.

The adder 334 is coupled to the output voltage regulator 331 and the current converter 3322 of the error current generator 332, for generating a first driving current $I_{D1}$ corresponding to a sum of the first error current $I_{error1}$ and the first reference current $I_{ref1}$.

The first pulse-width modulator 336 is coupled to the adder 334 and the first converting circuit 4. The first pulse-width modulator 336 receives the first driving current $I_{D1}$, generates a first driving signal D1 according to the first driving current $I_{D1}$, and provides the first driving signal D1 to the first converting circuit 4, for driving operation thereof.

The subtractor 335 is coupled to the output voltage regulator 331 and the current converter 3322 of the error current generator 332, for generating a second driving current $I_{D2}$ corresponding to a difference between the second error current $I_{error2}$ and the second reference current $I_{ref2}$.

The second pulse-width modulator 337 is coupled to the subtractor 335 and the second converting circuit 5. The second pulse-width modulator 337 receives the second driving current $I_{D2}$, generates a second driving signal D2 according to the second driving current $I_{D2}$, and provides the second driving signal D2 to the second converting circuit 5, for driving operation thereof.

Figure 10:
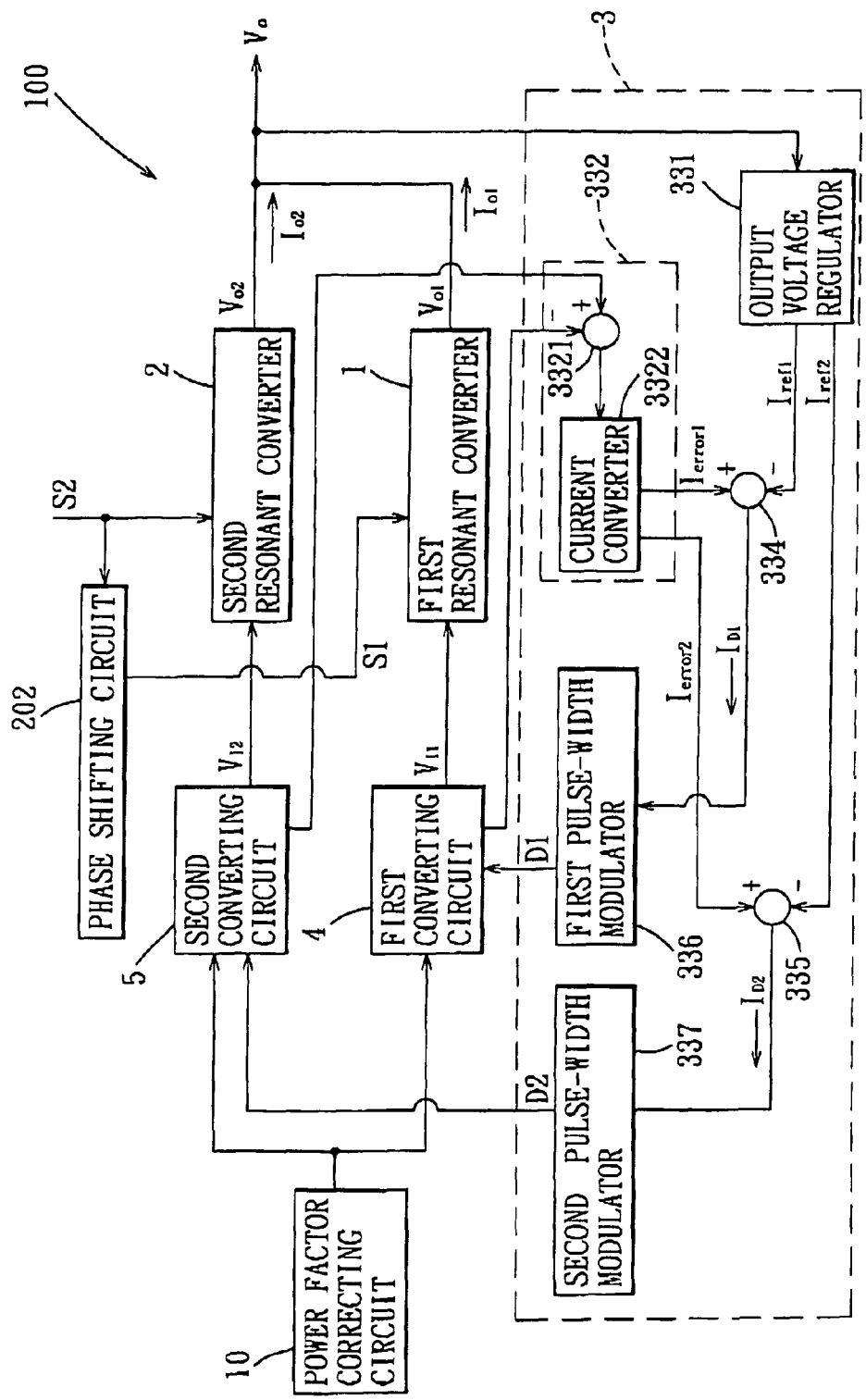
FIG. 10 is a schematic circuit block diagram of the sixth preferred embodiment of a power supply device according to the present invention.

Referring to FIG. 10, the sixth preferred embodiment of a power supply device 100 of the present invention is similar to the fifth preferred embodiment. The error subtractor 3321 of the error current generator 332 of the power supply device 100 of the sixth preferred embodiment, however, is coupled to the first and second converting circuits 4, 5, for generating the error reference signal (not shown) corresponding to a difference between a first inductor current $I_{L1}$ flowing through a storage inductor of the first converting circuit 4, and a second inductor current $I_{L2}$ flowing through a storage inductor of the second converting circuit 5. The error subtractor 3321 is coupled to the current converter 3322, for providing the error reference signal thereto. The operations of, functions of, and circuit connections among the other components in the sixth preferred embodiment are the same as those in the fifth preferred embodiment.

In summary, the current regulating circuit 3 of the power supply device 100 of the present invention regulates at least one of the first and second input voltages $V_{I1}$, $V_{I2}$ from the first and second converting circuits 4, 5 according to a difference between the first and second output currents $I_{O1}$, $I_{O2}$ from the first and second resonant converters 1, 2, such that the first and second output currents $I_{O1}$, $I_{O2}$ are substantially equal in magnitude. Furthermore, the phase shifting circuit 202 and the voltage regulator 201 of the control signal generating circuit 20 generate the first control signal S1 and the second control signal S2 for regulating the output voltage $V_O$ while minimizing ripple factor of the first and second output currents $I_{O1}$, $I_{O2}$.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power supply device for providing an output voltage, comprising:
    a first resonant converter for receiving a first input voltage and converting the first input voltage into the output voltage, said first resonant converter having an input end, and an output end for outputting the output voltage;
    a second resonant converter for receiving a second input voltage and converting the second input voltage into the output voltage, said second resonant converter having an output end for outputting the output voltage, said output ends of said first and second resonant converters being coupled in parallel;
    a first converting circuit coupled to said input end of said first resonant converter and operable to provide the first input voltage to said first resonant converter; and
    a current regulating circuit coupled to said first and second resonant converters for receiving signals that are related to output currents of said first and second resonant converters, said current regulating circuit driving operation of said first converting circuit according to the signals received thereby such that the output currents of said first and second resonant converters have substantially equal magnitudes.

2. The power supply device as claimed in claim 1, wherein said first converting circuit receives the second input voltage and converts the second input voltage into the first input voltage.

3. The power supply device as claimed in claim 1, wherein said current regulating circuit includes:
    a subtractor coupled to said output ends of said first and second resonant converters for generating a first error signal corresponding to a difference between currents received from said first and second resonant converters, respectively; and
    a current regulator coupled to said subtractor and said first converting circuit, said current regulator receiving the first error signal, generating a first driving signal according to the first error signal, and providing the first driving signal to said first converting circuit for driving operation of said first converting circuit.

4. The power supply device as claimed in claim 1, wherein said first converting circuit includes a storage inductor, and said current regulating circuit includes:
    a subtractor coupled to said second resonant converter and said first converting circuit for generating a first error signal corresponding to a difference between input current of said second resonant converter and inductor current of said storage inductor of said first converting circuit; and
    a current regulator coupled to said subtractor and said first converting circuit, said current regulator receiving the first error signal, generating a first driving signal according to the first error signal, and providing the first driving signal to said first converting circuit for driving operation of said first converting circuit.

5. The power supply device as claimed in claim 1, wherein said first converting circuit is one of a buck converter, a boost converter, and a buck-boost converter.

6. The power supply device as claimed in claim 1, further comprising a control signal generating circuit coupled to said first and second resonant converters for generating a first control signal and a second control signal according to the output voltage, the first and second control signals being provided to said first and second resonant converters, respectively, for controlling the output voltage from said first and second resonant converters.

7. The power supply device as claimed in claim 6, wherein said control signal generating circuit includes
   a voltage regulator coupled to said first and second resonant converters for receiving the output voltage, and generating the second control signal according to the output voltage, said voltage regulator being further coupled to said second resonant converter for providing the second control signal thereto, and
   a phase shifting circuit coupled to said voltage regulator for receiving the second control signal, and generating the first control signal by phase shifting the second control signal by a predetermined angle, said phase shifting circuit being further coupled to said first resonant converter for providing the first control signal thereto.

8. The power supply device as claimed in claim 7, wherein said first and second control signals have the same amplitude and a 90-degree phase difference.

9. The power supply device as claimed in claim 1, wherein said second resonant converter further has an input end, said power supply device further comprising a second converting circuit coupled to said input end of said second resonant converter and operable to provide the second input voltage to said second resonant converter.

10. The power supply device as claimed in claim 9, wherein said current regulating circuit includes:
    an output voltage regulator coupled to said first and second resonant converters for generating first and second reference currents that correspond to the output voltage;
    a first subtractor coupled to said output voltage regulator and said first resonant converter for generating a first error signal corresponding to a difference between current received from said first resonant converter and the first reference current;
    a first current regulator coupled to said first subtractor and said first converting circuit, said first current regulator receiving the first error signal, generating a first driving signal according to the first error signal, and providing the first driving signal to said first converting circuit for driving operation of said first converting circuit;
    a second subtractor coupled to said output voltage regulator and said second resonant converter for generating a second error signal corresponding to a difference between current received from said second resonant converter and the second reference current; and
    a second current regulator coupled to said second subtractor and said second converting circuit, said second current regulator receiving the second error signal, generating a second driving signal according to the second error signal, and providing the second driving signal to said second converting circuit for driving operation of said second converting circuit.

11. The power supply device as claimed in claim 9, wherein each of said first and second converting circuits has a storage inductor, and said current regulating circuit includes:
    an output voltage regulator coupled to said first and second resonant converters for generating first and second reference currents that correspond to the output voltage;
    a first subtractor coupled to said output voltage regulator and said first converting circuit for generating a first error signal corresponding to a difference between inductor current of said storage inductor of said first converting circuit and the first reference current;
    a first current regulator coupled to said first subtractor and said first converting circuit, said first current regulator receiving the first error signal, generating a first driving signal according to the first error signal, and providing the first driving signal to said first converting circuit for driving operation of said first converting circuit;
    a second subtractor coupled to said output voltage regulator and said second converting circuit for generating a second error signal corresponding to a difference between inductor current of said storage inductor of said second converting circuit and the second reference current; and
    a second current regulator coupled to said second subtractor and said second converting circuit, said second current regulator receiving the second error signal, generating a second driving signal according to the second error signal, and providing the second driving signal to said second converting circuit for driving operation of said second converting circuit.

12. The power supply device as claimed in claim 9, wherein said current regulating circuit includes:
    an output voltage regulator coupled to said first and second resonant converters for generating first and second reference currents that correspond to the output voltage;
    an error current generator coupled to said output ends of said first and second resonant converters for generating first and second error currents each corresponding to a difference between currents received from said first and second resonant converters, respectively;
    an adder coupled to said output voltage regulator and said error current generator for generating a first driving current corresponding to a sum of the first error current and the first reference current;
    a first pulse-width modulator coupled to said adder and said first converting circuit, said first pulse-width modulator receiving the first driving current, generating a first driving signal according to the first driving current, and providing the first driving signal to said first converting circuit for driving operation of said first converting circuit;
    a subtractor coupled to said output voltage regulator and said error current generator for generating a second driving current corresponding to a difference between the second error current and the second reference current; and
    a second pulse-width modulator coupled to said subtractor and said second converting circuit, said second pulse-width modulator receiving the second driving current, generating a second driving signal according to the second driving current, and providing the second driving signal to said second converting circuit for driving operation of said second converting circuit.

13. The power supply device as claimed in claim 9, wherein each of said first and second converting circuits has a storage inductor, and said current regulating circuit includes:
    an output voltage regulator coupled to said first and second resonant converters for generating first and second reference currents that correspond to the output voltage;
    an error current generator coupled to said first and second converting circuits for generating first and second error currents each corresponding to a difference between inductor currents of said storage inductors of said first and second converting circuits, respectively;
    an adder coupled to said output voltage regulator and said error current generator for generating a first driving current corresponding to a sum of the first error current and the first reference current;

a first pulse-width modulator coupled to said adder and said first converting circuit, said first pulse-width modulator receiving the first driving current, generating a first driving signal according to the first driving current, and providing the first driving signal to said first converting circuit for driving operation of said first converting circuit;

a subtractor coupled to said output voltage regulator and said error current generator for generating a second driving current corresponding to a difference between the second error current and the second reference current; and a second pulse-width modulator coupled to said subtractor and said second converting circuit, said second pulse-width modulator receiving the second driving current, generating a second driving signal according to the second driving current, and providing the second driving signal to said second converting circuit for driving operation of said second converting circuit.

14. The power supply device as claimed in claim 9, wherein each of said first and second converting circuits is one of a boost convert, a buck converter, and a boost-buck converter.

15. The power supply device as claimed in claim 9, wherein said first and second resonant converters are configured to receive first and second control signals, respectively, for controlling the output voltage from said first and second resonant converters.

16. The power supply device as claimed in claim 15, further comprising a phase shifting circuit for receiving the second control signal, and generating the first control signal by phase shifting the second control signal by a predetermined angle.

17. The power supply device as claimed in claim 16, wherein the first and second control signals have the same amplitude and a 90-degree phase difference.

18. A uniform current control method to be performed by a power supply device that includes a first resonant converter and a second resonant converter having output ends thereof coupled in parallel, a converting circuit coupled to an input end of the first resonant converter, and a current regulating circuit coupled to the first and second resonant converters, said uniform current control method comprising the steps of:
  (A) configuring the current regulating circuit of the power supply device for sampling output currents of the first and second resonant converters in order to obtain signals related to the output currents of the first and second resonant converters;
  (B) configuring the current regulating circuit to drive operation of the converting circuit according to the signals obtained in step (A); and
  (C) configuring the converting circuit to provide an input voltage to at least one of the first and second resonant converters, such that the output currents of the first and second resonant converters are controlled to have substantially equal magnitudes.

* * * * *